E. C. HAXTON.
LUBRICATING RING.
APPLICATION FILED MAR. 5, 1915.
1,164,090.
Patented Dec. 14, 1915.
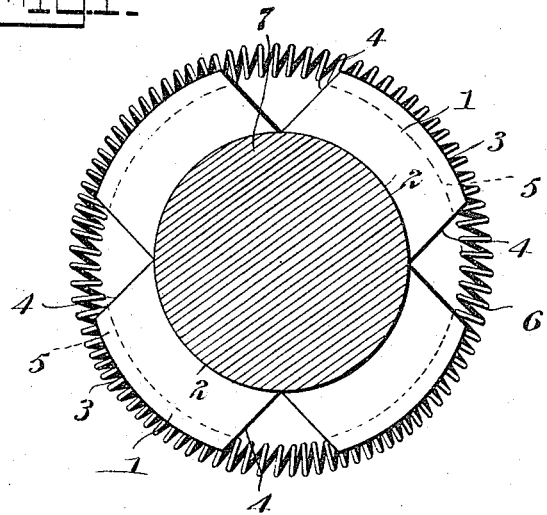
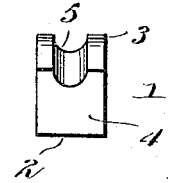
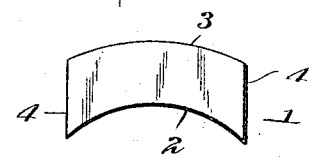
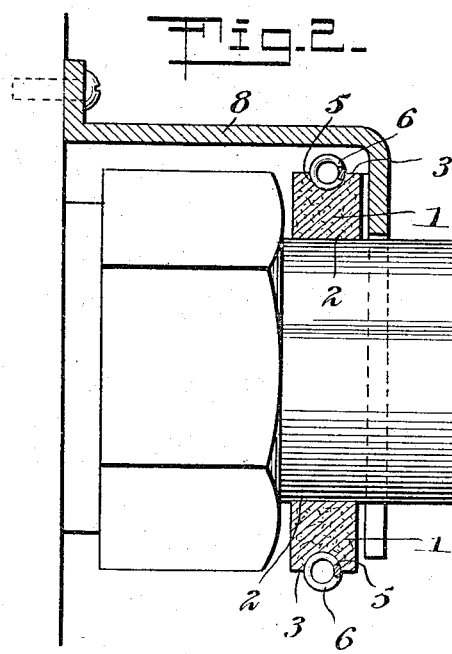
Witnesses
Frederick W. Ely.
Inventor
Elmer C. Haxton,
By Victor J. Evans
Attorney

UNITED STATES PATENT OFFICE.

ELMER CLIFFORD HAXTON, OF NEW HAVEN, CONNECTICUT.

LUBRICATING-RING.

1,164,090.

Specification of Letters Patent. Patented Dec. 14, 1915.

Application filed March 5, 1915. Serial No. 12,442.

*To all whom it may concern:*

Be it known that I, ELMER C. HAXTON, a citizen of the United States, residing at New Haven, in the county of New Haven and State of Connecticut, have invented new and useful Improvements in Lubricating-Rings, of which the following is a specification.

My invention relates to lubricating rings for lubricating piston and other like rods, and one of its objects is to provide a construction by which a lubricating ring may be made of graphite and employed in a reliable and effective manner.

A further object of the invention is to provide a construction of ring composed of segments bound by a contractile spring, the segments being of such contour, that as the material wears away, the ring sectors will be uniformly drawn inward to at all times maintain the original diameter of the ring until the ring is entirely worn out.

The invention consists of the features of construction, combination and arrangement of parts herein fully described and claimed, reference being had to the accompanying drawing in which:—

Figure 1 is a side elevation of a lubricating ring embodying my invention. Fig. 2 is a transverse section of the same. Fig. 3 is a side view on an enlarged scale of one of the segmental blocks. Fig. 4 is an end view of the same.

In carrying my invention into practice, I provide a lubricating ring consisting of four equal parts or segments 1, each formed of a block of graphite or graphite combined with any suitable fat or unctuous substance. The segmental blocks or sections 1, which are molded or otherwise formed, have curved inner and outer faces 2 and 3 and straight parallel end faces 4, and the outer curved faces 3 of the ring segments are formed with grooves 5 to receive a coiled contractile spring 6.

The blocks 1 are arranged in position about the rod 7 so that their inner concaved faces 2 will lie in contact with the surface of the rod, the blocks being held assembled in ring form about the rod by the spring 6. As the rod 7 reciprocates, the lubricator ring being held from motion therewith in any suitable manner, it will be evident that the surface of the rod will move in frictional engagement with the surfaces 2 of the ring segments, as a result of which graphite will be scraped from the segments and deposited on the rods so as to fill up all small scratches or voids in the metal of the rod, as well as all crevices between the rod and the metallic or soft packings employed, insuring a smooth and easy motion of the rod under all conditions. The surfaces 2 and 3 of the segments are arranged on arcs of the same radii, and are of the same circumferential length, so that as the blocks were away it will be evident that the spring 6 in contracting will move the segments 1 inwardly to like distances, thereby always preserving the interior diameter of the ring, which will therefore always perfectly and smoothly fit about the rod. When the ring segments are worn down until no longer of use, it will of course be understood that a new ring may be substituted therefor, or that new blocks may be employed in conjunction with the spring of the old ring. In practice, a shield 8 may be also used at the front of the packing and ring to hold the same from sliding on the rod.

I claim:—

1. A lubricating ring for piston rods and the like, comprising a series of ring segments formed of a lubricating composition including graphite; and a coiled contractile spring engaging and holding said ring segments in ring form.

2. A lubricating ring for piston rods and the like, comprising a series of segmental blocks, having curved inner and outer faces and straight end edges, the outer faces being longitudinally grooved, and the said inner and outer faces being curved on arcs of the same radii and of the same circumferential length, and a coiled contractile spring surrounding said segments and seated in the grooves thereof.

3. A lubricating ring for piston rods and the like, comprising a series of ring segments, having curved inner and outer faces and straight end edges, each of said segments being formed of a lubricating composition including graphite, and the said inner and outer faces of the segments being curved on arcs of the same radii and of the same circumferential length, a coiled contractile spring engaging and holding said ring segments in ring form.

In testimony whereof I affix my signature in presence of two witnesses.

ELMER CLIFFORD HAXTON.

Witnesses:
ALEXANDER HAXTON,
RICHARD M. RUSSELL.